(12) United States Patent
McClellan et al.

(10) Patent No.: US 6,909,567 B2
(45) Date of Patent: Jun. 21, 2005

(54) PIN LAYER REVERSAL DETECTION

(75) Inventors: Brett A. McClellan, Laguna Hills, CA (US); Zubir Adal, Union City, CA (US)

(73) Assignee: Texas Instruments Incorporated, Dallas, TX (US)

( * ) Notice: Subject to any disclaimer, the term of this patent is extended or adjusted under 35 U.S.C. 154(b) by 523 days.

(21) Appl. No.: 10/053,394

(22) Filed: Oct. 29, 2001

(65) Prior Publication Data

US 2002/0063984 A1 May 30, 2002

Related U.S. Application Data

(60) Provisional application No. 60/253,614, filed on Nov. 28, 2000.

(51) Int. Cl.[7] .................................................. G11B 5/09
(52) U.S. Cl. ........................................ 360/46; 360/75
(58) Field of Search .......................... 360/46, 67, 324.1, 360/75

(56) References Cited

U.S. PATENT DOCUMENTS

| | | |
|---|---|---|
| 5,650,887 A | 7/1997 | Dovek et al. |
| 6,295,175 B1 * | 9/2001 | Tomita et al. ................. 360/31 |
| 6,507,447 B1 * | 1/2003 | Takahashi ...................... 360/46 |
| 6,646,822 B1 * | 11/2003 | Tuttle et al. ................... 360/46 |

OTHER PUBLICATIONS

"GMR Design Dilemma: To Reset or Go Robust?", Pennwellnet. Com, Oct. 1999. vol. 6 Issue II.

* cited by examiner

*Primary Examiner*—David Hudspeth
*Assistant Examiner*—Varsha A. Kapadia
(74) *Attorney, Agent, or Firm*—W. Daniel Swayze, Jr.; W. James Brady; Frederick J. Telecky, Jr.

(57) ABSTRACT

A circuit to detect pin layer reversal including an input circuit to receive an input signal having a first portion to indicate a pin layer reversal and having a second portion to indicate a servo sync mark, a first servo sync mark detector for detecting a positive servo sync mark from the input signal, a second servo sync mark detector for detecting a negative servo sync mark from the input signal, and a circuit responsive to the positive servo sync mark and the negative servo sync mark to generate a signal to indicate if the servo sync mark has been reversed and to generate a signal to indicate the pin layer reversal.

3 Claims, 5 Drawing Sheets

PIN LAYER REVERSAL DETECTION

This application claims priority under 35 USC §119(e)(1) of provisional application Ser. No. 60/253,614, filed Nov. 28, 2000.

FIELD OF THE INVENTION

The present invention relates to a storage system and to a read channel which is used in the storage system. More particularly, the present invention relates to a circuit for the read channel that detects both pin layer reversal and detects if the polarity is reversed.

BACKGROUND OF THE INVENTION

An MR sensor detects magnetic field signals through the resistance changes of a magneto-resistive element, fabaricated of a magnetic material, as a function of the strength and direction of magnetic flux being sensed by the element. The conventional MR sensor operates on the basis of the anisotropic magneto-resistive (AMR) effect in which a component of the element resistance varies as the square of the cosine of the angle between the magnetization in the element and the direction of sense or bias current flow through the element.

MR sensors have application in magnetic recording systems because recorded data can be read from a magnetic medium when the external magnetic field from the recorded magnetic medium (the signal field) causes a change in the direction of magnetization in an MR head. This in turn causes a change in electrical resistance in the MR read head and a corresponding change in the sensed current or voltage.

A different and more pronounced magneto-resistance, called a giant magneto-resistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr or Co/Cu multilayers exhibiting strong antiferromagnetic coupling of the ferro-magnetic layers as well as in essentially uncoupled layered structures in which the magnetization orientation in one of the two ferro-magnetic layers is fixed or pinned. The physical origin is the same in all types of GMR structures; namely, the application of an external magnetic field causes a variation in the relative orientation of the magnetizations of neighboring ferro-magnetic layers. This in turn causes a change in the spin-dependent scattering of conductive electrons and, thus, the electrical resistance of the structure. The resistance of the structure changes as the relative alignment of the magnetizations of the ferromagnetic layers changes.

A particularly useful application of GMR is a sandwich structure including two essentially uncoupled ferromagnetic layers separated by a nonmagnetic metallic spacer layer in which the magnetization of one of the ferromagnetic layers in "pinned." The pinning may be achieved by depositing the ferro-magnetic layer to be pinned onto an antiferro-magnetic layer, such as an iron-manganese (Fe—Mn) layer, to create an interfacial exchange coupling between the two layers. The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which exchange anisotropy vanishes because the local anisotropy of the antiferro-magnetic layer, which decreases with temperature, has become too small to anchor the antiferromagnetic spins to the crystallographic lattice. The unpinned or "free" ferromagnetic layer may also have the magnetization of its extensions (those portions of the free layer on either side of the central active sensing region) also fixed, but in a direction perpendicular to the magnetization of the pinned layer so that only the magnetization of the free-layer central active region is free to rotate in the presence of an external field. The magnetization in the free-layer extensions may be fixed by longitudinal hard biasing or exchange coupling to an antiferromagnetic layer. However, if exchange coupling is used, the antiferromagnetic material is different from the antiferromagnetic material used to pin the pinned layer and is typically nickel-manganese (Ni—Mn). This resulting structure is called a "spin valve" (SV) MR sensor.

The spin-valve head has the same stabilization issues as conventionally designed GMR heads. In particular, these problems are exacerbated by its multilayer structure. Typically, there are three films whose domain structures contribute directly to the sensitivity, signal-to-noise, and stability of the sensor. Namely, the antiferromagnetic (AF) pinning layer, the Co alloy pinned layer, and the NiFe free layer. With respect to conventional MR heads, the spin valve has an additional serious and unique reliability concern in that the AF/Co alloy structure is unstable and can be easily induced to rotate its magnetization. The sensor output is strongly influenced by the AF orientation and, as a result, the disturbed sensor may show poor asymmetry, degraded sensitivity, and increased noise compared to its performance in the intended orientation. The stability of the antiferromagnetic layer is the Achilles' heel of the spin valve. The misorientation of the AF magnetic pinning field can occur spontaneously or as a result of heating from electrical overstress, thermal asperities, or external influences. Heat, together with the magnetic field from the sense current, inverts the magnetization of the AF film. The creation of a thermally stable, antiferromagnetic film has become an important design criterion for spin valves. Thus, it is important to detect the pin layer reversal. This is especially true during servo operation.

In addition, during servo operation, it has been found that the polarity of the bits can be reversed. Thus, when reading data, it is important to detect the occurrences when this polarity has been reversed. For example, a pattern of bits or sync field are required to be identified. A bit reversal can make this identification difficult.

In conventional rotating disk data storage systems, it is common to employ some type of servo system to determine the radial position of the read/write transducer head over the disk surface and to maintain the transducer head over the center line of one of the concentric recording tracks during data reading and data writing operations. This is accomplished by providing servo information on one or more of the disk surfaces for access by the read/write transducer heads. In prior art, disk drives have included various known types of head positioning servo systems. In a pertinent prior art type of servo system, often referred to as an imbedded servo, the prerecorded servo information occupies positions (servo sectors) of each disk's recording surface, with the servo sectors being angularly spaced apart and interspersed among the data sectors of each concentric track. Servo sectors are prerecorded on the recording surface in arcuate sections, called frames, that run radially along the disk surface from the center to the outer edge. Frames are typically written at discrete angular intervals such that as the recording surface is rotated beneath an active read/write transducer head, servo sectors pass beneath the active head in time-quantifiable phases. Each servo phase represents the angular position of that servo frame on the recording surface, and the length of each servo phase defines a time period for servo processing circuitry in which servo information contained in the servo sector is presumed valid.

Furthermore, a servo sync field word includes a robust sync pattern which is written radially phase coherently by the servo writer as part of the manufacturing process such that the synchronization can always be achieved during a seek mode where an active read/write head may be positioned along the tracks.

SUMMARY OF THE INVENTION

The present invention provides a circuit that detects both pin layer reversal and detects if the polarity of the bits is reversed. The present invention uses information before the postcode circuit so that the polarity stream and the pin layer reversal information are not lost.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 11:
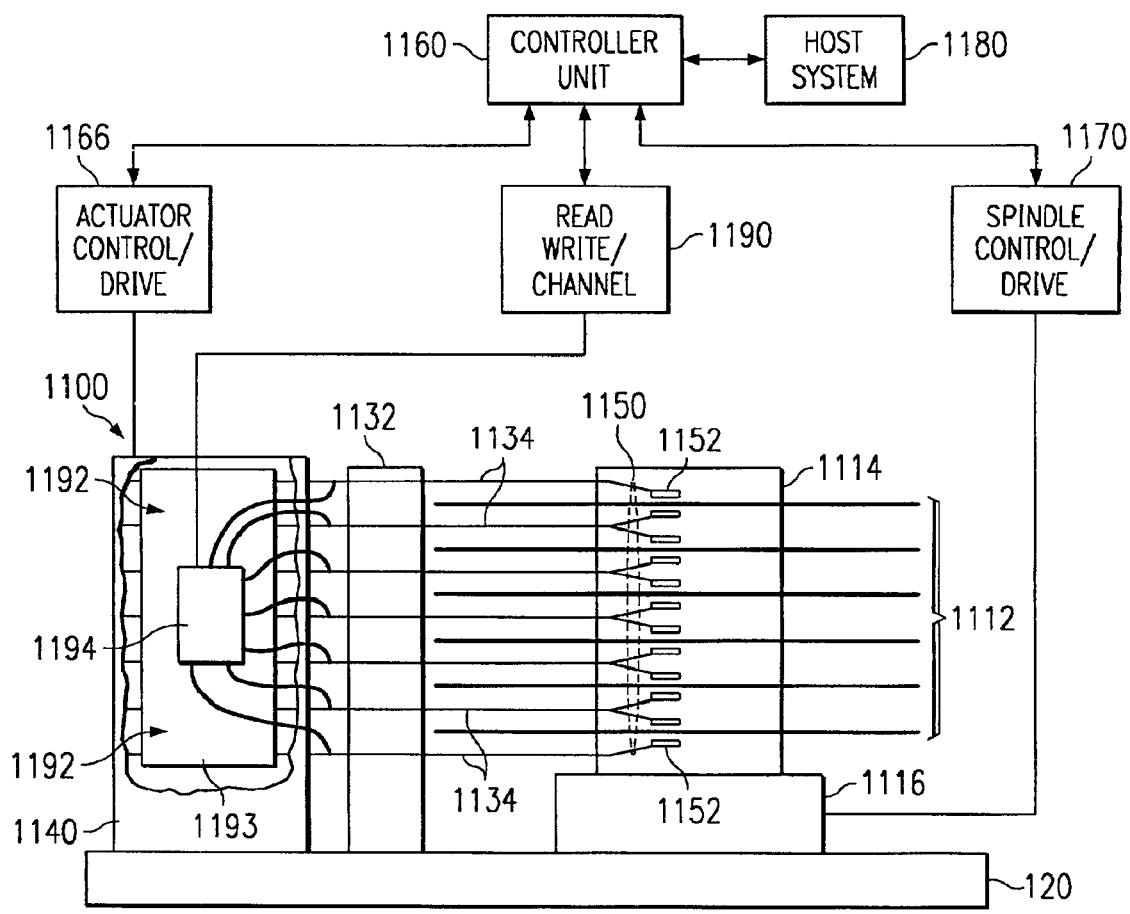
FIG. 11 illustrates a side view of a disk drive system.
Figure 12:
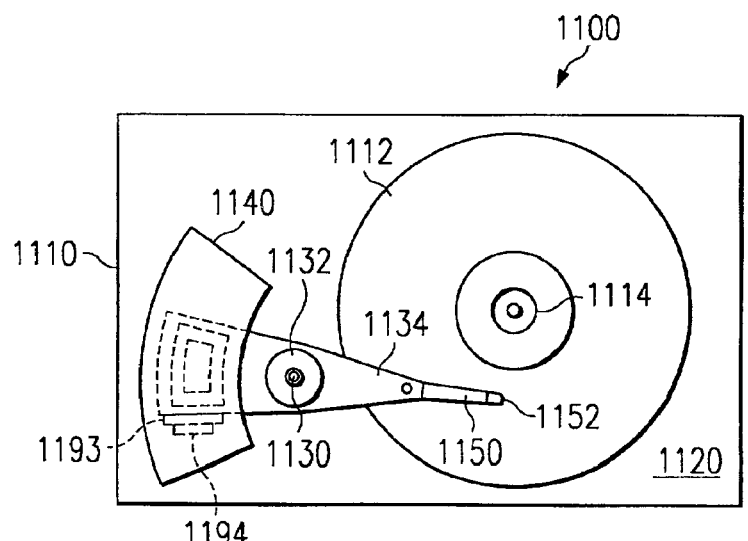
FIG. 12 illustrates a top view of a disk drive system.

FIGS. 11 and 12 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116 which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166 which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152. The read/write channel 1190 includes the pin layer reversal detection circuit of the present invention.

Figure 1:
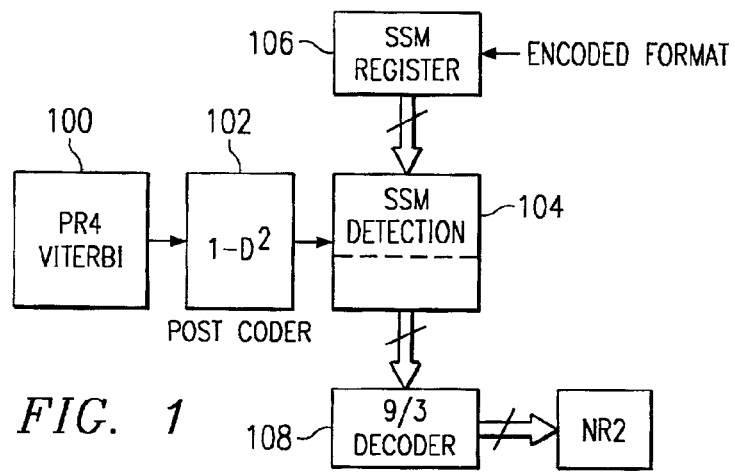
FIG. 1 illustrates a block diagram of a sync mark detection circuit.

In FIG. 1, the various circuits associated with the channel operation during servo operation, and more particularly for servo mark detection operation, are illustrated. The output from the PR4 Viterbi detector 100 is input to postcoder 102. Detection circuit 104 receives the output from the postcoder circuit 102. The encoded signal which has been stored in the servo sync mark register 106 is compared in the servo sync mark detector 104. The output is output to 9/3 decoder 108.

One aspect of the servo sync mark detector circuit illustrated in FIG. 1 is the fact that the postcoder 102 is output to servo sync mark detection circuit 104. The postcoder output from postcoder 102 is polarity independent and, consequently, it is impossible to determine whether or not a polarity reversal has occurred by solely using the output of the postcoder 102.

Figure 2:
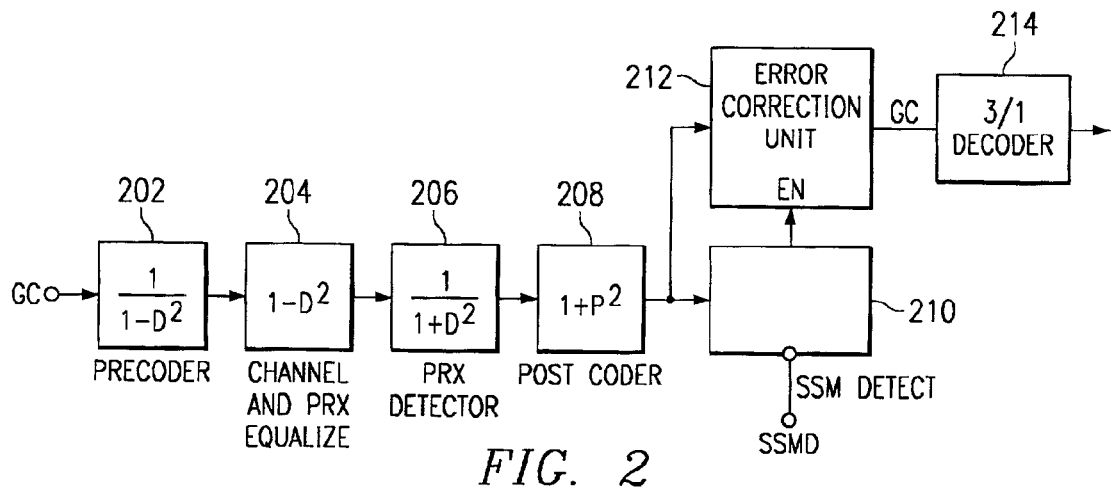
FIG. 2 illustrates a detail of FIG. 1 and the servo sync mark detection circuit.

FIG. 2 illustrates a block diagram of the circuit of FIG. 1. Here, the precoder 202 outputs to the channel and PR4 equalizer 204. The output from the channel and PR4 equalizer 204 is input to the PR4 decoder 206. The output of the PR4 decoder is input to the postcoder 208. Additionally, the output of the postcoder 208 is input to the error correction unit 212 and sync mark detector 210. The output of the error correction unit 212 is input to the decoder 214.

Figure 3:
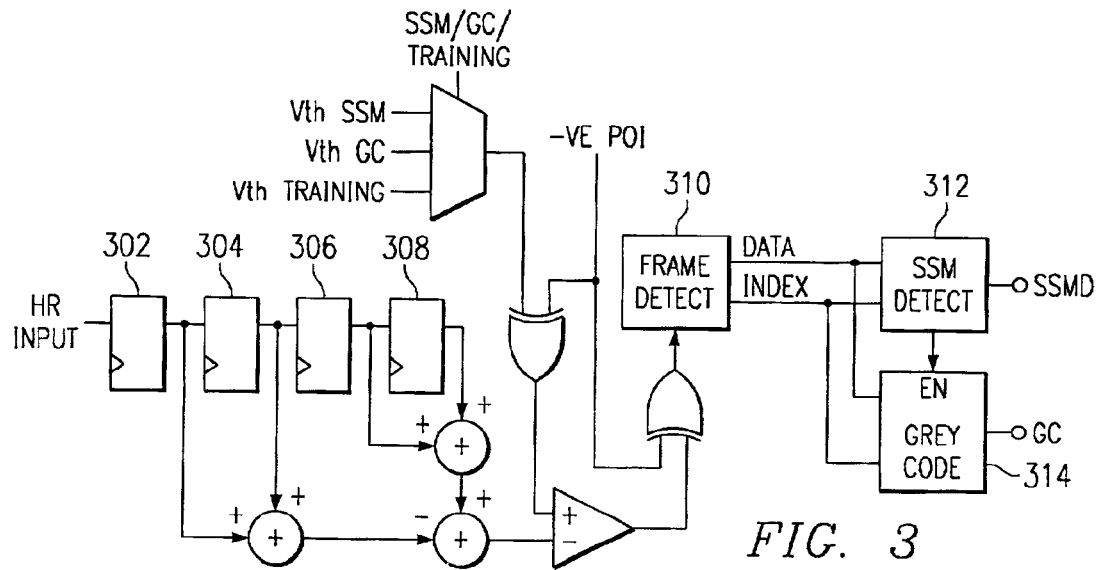
FIG. 3 illustrates another sync mark detection circuit.

FIG. 3 illustrates another circuit to provide a synchronous servo mark detector signal. This circuit includes four stages of delay circuits, namely delay circuit 302, 304, 306 and 308. These delay circuits 302, 304, 306 and 308 provide the function $1+D-D^2-D^3$. Thus, four samples with the approximate delay predetermined are used to indicate if a set of pulses has occurred to indicate synchronization. These delay circuits are used in conjunction with a frame detector circuit 310 to output a data signal and an index signal to a servo sync mark detector circuit 312 and a gray code detector circuit 314. The sync mark detector circuit 312 outputs a servo sync mark detector signal, and the gray code detector circuit 314 outputs a gray code. However, these circuits suffer from the defect of not providing a circuit to detect the polarity and whether or not a pin reversal has occurred.

Figure 4:
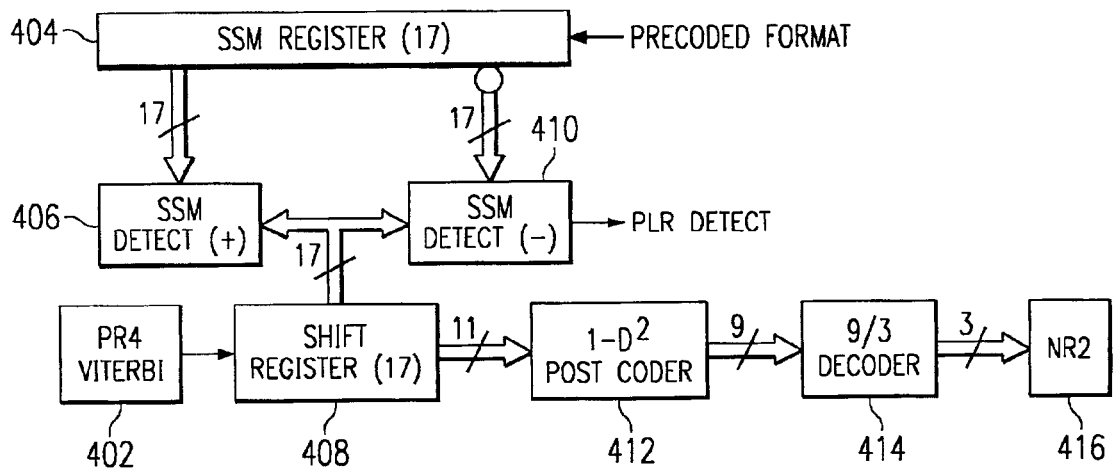
FIG. 4 illustrates an overall flow diagram of the present invention.

Turning now to FIG. 4, a broad circuit diagram of the present invention is illustrated. The PR4 Viterbi detector 402 is connected to shift register circuit 408. The precoded format signal, for example a signal being looked for in the servo sync mark signal, is input to the servo sync mark register 404, which may be a 17-bit register. The servo sync mark register 404 is connected both to the servo sync mark detection circuit 406 and the servo sync mark detection circuit 410. Both the servo sync mark detection circuit 406 and the servo sync mark detection circuit 410 are connected to the shift register 408, which may be a 17-bit shift register. The shift register 408 is connected to a postcoder 412. The postcoder 412 is connected to the decoder circuit 414, which may be a 9/3 decoder circuit, and the decoder circuit 414 is connected to the nonreturn to zero circuit 416. The precoded format signal is input to the servo sync mark register 404. The precoded format signal is output from the servo sync mark register 404 and is input both to the servo sync mark detection circuit 406 and the servo sync mark detection circuit 408. The PR4 Viterbi detector 402 receives the input signal from disk and outputs the input signal to shift register 408. The input signal is shifted along shift register 408. The output of shift register circuit 408 is input both to the servo sync mark detector circuit 406 and the servo sync mark detector circuit 410. The bits in servo sync mark detector circuit 410 are reversed. If a match is obtained between the precoded format signal and the signal input to the Viterbi detector 404 and servo sync mark detection circuit 410, then a pin layer reversal (PLR) signal is detected. If the servo sync mark detection circuit 406 obtains a match between the precoded format signal and the output of the PR4 Viterbi detector 404, namely the input signal, then no pin layer reversal detection signal is output. Next, the postcoder circuit 412 eliminates the coding imposed upon the input signal from a precoder (not shown). The decoder circuit 414 decodes the coded signal output from the postcode circuit 412. The nonreturn to zero circuit 416 performs.

Figure 5:
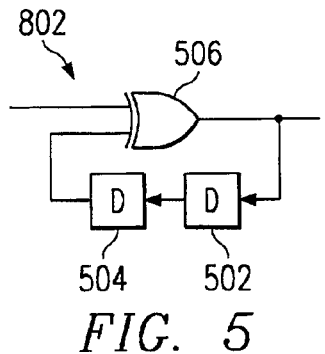
FIG. 5 illustrates a precoder circuit.
Figure 8:
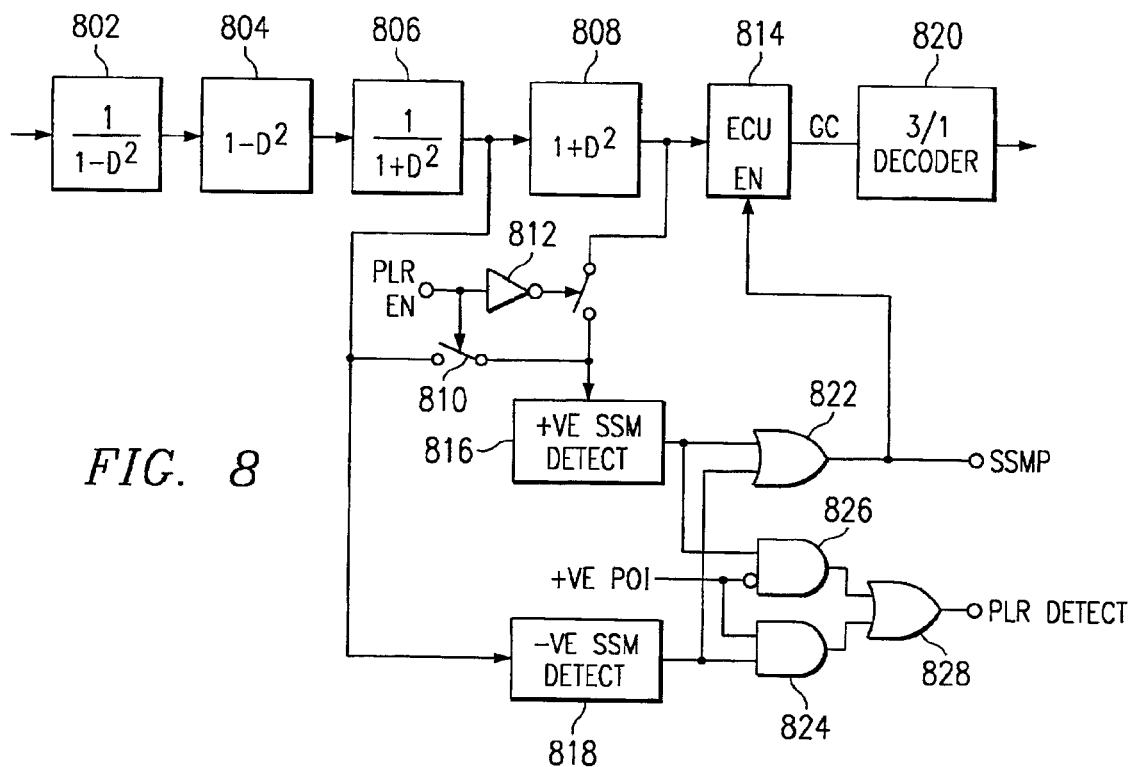
FIG. 8 illustrates a portion of the read channel including a circuit for detecting both pin layer reversal and servo sync mark detection.

FIG. 5 illustrates a decoder circuit in accordance with the present invention such as illustrated in FIG. 8 in element 802. An exclusive OR circuit 506 receives the input signal into exclusive OR circuit 506. The output of exclusive OR circuit 506 is input to delay circuit 502. The signal is delayed by a predetermined time period in delay circuit 502. The delay circuit 502 outputs a delayed signal to delay circuit 504. The delay circuit 504 delays by another predetermined time period the delayed signal input to delay circuit 504. The predetermined delay time period could be the same. The output of delay circuit 504 is input to exclusive OR circuit 506.

Figure 6:
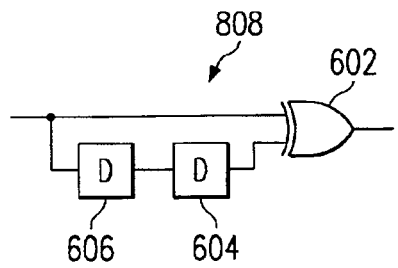
FIG. 6 illustrates a postcode circuit.

FIG. 6 illustrates a postcoder used in accordance with the present invention such as in FIG. 8 in element 808. The input signal to the postcoder is input to exclusive OR circuit 602 and additionally input into delay circuit 606. The delay circuit 606 delays by a predetermined time period the input signal and outputs a delayed signal to delay circuit 604. The delay circuit 604 delays by a predetermined time period, which may be different, the delayed input signal to output a double delayed output signal. The double delayed output signal from delay circuit 604 is input to exclusive OR circuit 602. The exclusive OR circuit performs an exclusive OR function on the input signals.

Figure 7:
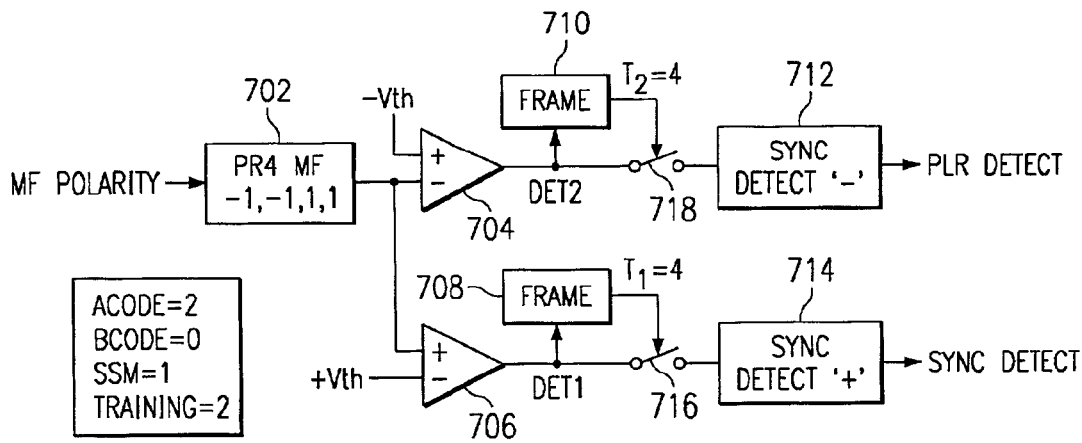
FIG. 7 illustrates a PR4 detection circuit.

Turning now to FIG. 7, FIG. 7 illustrates PR4 MF circuit 702. The output of PR4 MF circuit 702 is input to a negative terminal of comparator 704 and to a plus terminal of comparator 706. The comparator circuits 704 and 706 additionally input a threshold voltage. The threshold voltage is input to the plus terminal of comparator 704 while the threshold voltage is input to the negative terminal of comparator 706. The output of comparator 704 is input to switch 718 which is controlled by frame detect circuit 710. The output of comparator 706 is input to switch 716 which is controlled by frame detect circuit 708.

Turning now to FIG. 8, FIG. 8 illustrates a portion of the read channel and a detection circuit for both pin layer reversal and detecting if the polarity has been reversed.

Figure 10:
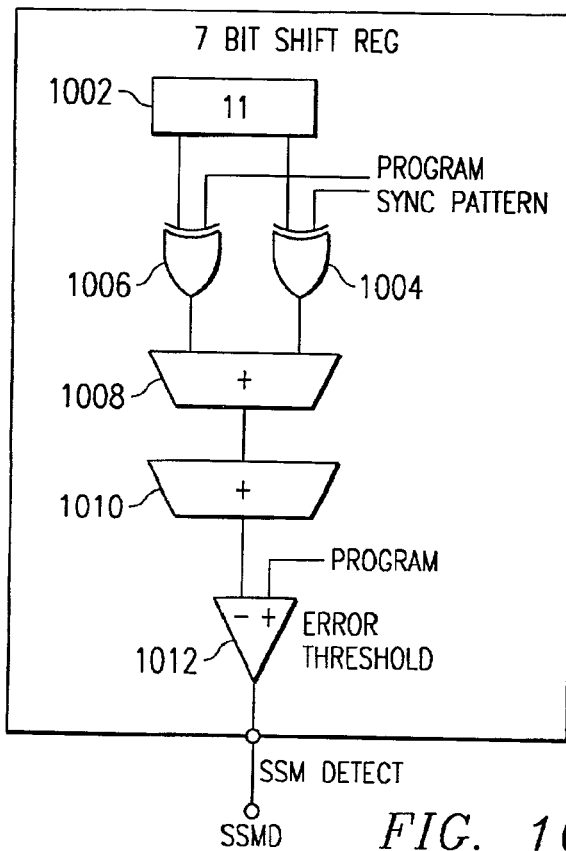
FIG. 10 illustrates a sync detector.

FIG. 10 illustrates a servo sync detection circuit in accordance with the present invention. The sync detector illustrated in FIG. 10 could be implemented as element 816 or element 818. As illustrated in FIG. 10, a shift register 1002 receives an input signal. The input signal is shifted along the shift register 1002. The output of shift register 1002 is input to a series of exclusive OR circuits, all of which receives the program sync signal and the output from the shift register circuit 1002. These determine the number of errors in the bits contained in the shift register circuit 1002. Although two exclusive OR circuits 1004 and 1006 are shown, additional exclusive OR circuits could be used, corresponding to each output of shift register 1002. The output of the exclusive OR circuits 1004 and 1006 is input to a series of summing circuits illustrated as sum circuits 1008 and 1010. The output of the sum circuits 1008 and 1010 are input to a compare circuit 1012 which compares the output of the sum circuits 1008 and 1010 to a program error threshold signal, and if the summation of errors is less than the program error threshold, a servo sync mark detect signal has been established. This indicates the servo sync detect signal has been found.

Turning now to FIG. 8, FIG. 8 includes a precoder 802 connected to a channel PR4 equalizer 804, and the channel PR4 equalizer 804 is connected to PR4 detector 806. The input signal is input to the precoder 802. The precoder 802 precodes the input signal and outputs a precoded signal to the channel PR4 equalizer 804. The channel PR4 equalizer 804 performs equalization and various timing functions. The output of channel PR4 equalizer 804 is input to PR4 decoder 806. The PR4 decoder 806 decodes the signal output from the channel PR4 equalizer 804. The PR4 detector 806 is connected to the postcoder 808. However, the output from the decoder 806 is input to the servo sync mark detect circuit 816 through switch 810. The switch 810 is controlled by a pin layer reverse enable signal. Additionally, the output of the PR4 decoder 806 is input to the servo sync mark detector circuit 818. Although order is not important, the sync mark detection circuit 816 detects a normal sync mark, while the sync mark detector circuit 818 detects a negative sync mark (bit position reversed). The output of sync mark detector circuit 816 is input to OR circuit 822. Also, the input to OR circuit 822 is connected to the output of sync mark detector circuit 816 and sync mark detector circuit 818. The output of the decoder 806 is input to both sync mark detector circuits 816 and 818. Sync mark detector circuit 816 detects the normal signal while sync mark detector circuit 818 detects the inverted signal, and correspondingly, upon detection of the normal signal or the inverted signal, the corresponding sync mark detector circuit 816 or 818 outputs a signal to the exclusive OR circuit 822. Additionally, the output of the sync mark detection circuit 816 is input to AND circuit 826, and the output of sync mark detection circuit 818 is input to AND circuit 824. Additionally, input to the AND circuit 826 and the AND circuit 824 is a positive polarity signal. The output of AND circuit 826 and the output of AND circuit 824 is input to exclusive OR circuit 828. The AND circuit 826 performs a logical AND operation upon the input from the sync mark detection circuit 816 and the positive polarity signal. The AND circuit 824 performs a logical AND operation on the output of servo sync mark detector 818 on the positive polarity signal. The output of exclusive OR circuit 828 is the pin layer detection circuit, and the output of OR circuit 822 is the sync mark detection circuit signal. The pin layer detection signal provides an indication if there has been a pin layer reversal or if the servo data has been inverted.

Figure 9:
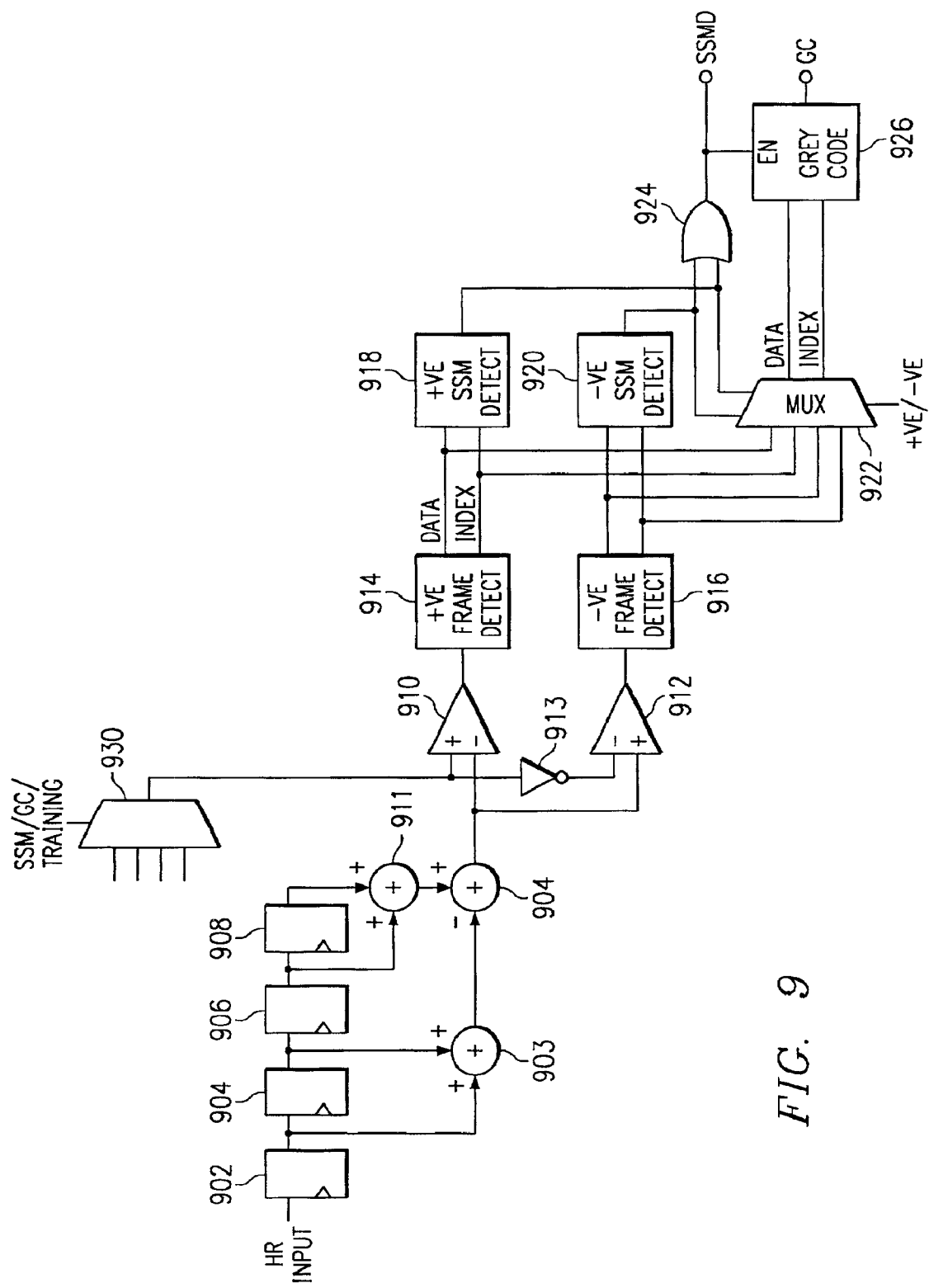
FIG. 9 illustrates another implementation portion of the read channel to include a circuit for pin layer reverse detection and servo sync mark detection.

Turning now to FIG. 9, this implementation does not require a Viterbi detector and does not require an equalizer. In FIG. 9, a series of delay circuits, namely delay circuit 902, delay circuit 904, delay circuit 906 and delay circuit 908 are connected in series. The output of delay circuit 902 is connected to a summing circuit 903. The output of delay circuit 904 is additionally connected to the summing circuit 903. The summing circuit 903 is connected to a summing circuit 909. The summing circuit 903 is connected to the negative input of summing circuit 909. Additionally, the output of delay circuit 906 is connected to summing circuit 911, and the output of delay circuit 908 is connected to summing circuit 911. The summing circuit 911 is connected to a plus input of summing circuit 909. The summing circuit 909 is connected to a negative input of comparator 910. The delay circuit 902 is connected to the delay circuit 904. The delay circuit 904 is connected to the delay circuit 906, which is in turn connected to the delay circuit 908. An input to the FIR circuit (not shown) is input to the delay circuit 902. The delay circuit 902 delays the FIR input signal and outputs a first delayed signal to delay circuit 904 and summing circuit 903. The delay circuit 904 delays the first delay signal output from the delay circuit 902 and outputs a second delay signal which is input to the delay circuit 906 and to the summing circuit 903. The summing circuit 903 sums the output of delay circuit 902 and delay circuit 904, namely the first delay signal and the second delay signal, to produce a first summed signal which is input to delay circuit 909. The second delay signal is delayed by delay circuit 906 which outputs a third delay signal both to delay circuit 908 and to the plus input of summing circuit 911. The delay circuit 908 delays the third delay signal and outputs a fourth delayed signal which is input to the plus input of summing circuit 911. The output of summing circuit 911 is input to the plus input of summing circuit 909. Additionally, the output from summing circuit 911 is subtracted by the output of summation of 903. The resulting signal from summing circuit 909 is input to comparator 910 as well as comparator 912.

The circuit 930 outputs a dibit signal indicating if a dibit has occurred or a dibit has not occurred. This dibit signal is directly input to comparator 910. The output of circuit 930 is inverted by inversion circuit 913, and the inverted output signal from the inversion circuit 913 is input to a negative input of comparator circuit 912. The comparator circuit 910 compares the output from circuit 930 with the output from summing circuit 909 and outputs a first compared signal to a frame detect circuit 914. The inverted output signal from inverse circuit 913 is compared with the output of summing circuit 909 by comparator 912, and the output from comparator 912, a second compared signal, is output to frame detect circuit 916. The frame detect circuit 914 may detect normal signals while the frame detect circuit 916 detects inverted signals. Both frame detect circuit 914 and frame detect circuit 916 output a data signal as well as an index signal. The frame detect circuit 914 outputs a first data signal and a first index signal. The frame detect circuit 916 outputs a second data signal and a second index signal. The data signal is a and the index signal is a. The output, namely first data signal and first index signal, from the frame detect circuit 914 is input to the servo sync mark detect circuit 918. Likewise, the output, namely the second data signal and the second index signal, of frame detect circuit 916 is output to the servo sync mark detect circuit 920. Similar to the frame detect circuit 914, the servo sync mark detect circuit 918 detects normal servo sync marks while the servo sync mark detect circuit 920 detects negative servo sync marks. The first data signal and the first index signal from frame detect circuit 914 is input to mux circuit 922. Additionally, the second data signal and the second index signal from frame detect circuit 916 is input to mux circuit 922. The mux circuit 922 muxes the first data signal from frame detect circuit 914 with the second data signal from the frame detect circuit 916 to output a mux data signal. Additionally, the first index signal from frame detect circuit 914 is muxed with the second index signal from the frame detect circuit 916 to output a muxed index signal. The mux circuit 922 is controlled by the output of the servo sync mark detect circuit 918 and, in addition, is controlled by the output of servo sync mark detect circuit 920. When a normal servo sync mark detect signal is detected, the data and index from frame detect circuit 914 is output from mux circuit 922 to the gray code circuit 926. Likewise, when the servo sync mark detect circuit 922 detects an inverted sync mark detect signal, the data and index from frame detect circuit 916 is output to the gray code circuit 926. Thus, the gray code circuit 926 always has correct information. Likewise, the output from the servo sync mark detect circuit 918 and the servo sync mark detect circuit 920 is logically ANDed together in AND circuit 924. The output of AND circuit 924 is a servo sync mark detect signal. The output from gray code detector 926 is a gray code detected signal.

What is claimed is:

1. A circuit to detect pin layer reversal, comprising:

an input circuit to receive an input signal having a first portion to indicate a pin layer reversal and having a second portion to indicate a servo sync mark;

a first servo sync mark detector for detecting a positive servo sync mark from said input signal;

a second servo sync mark detector for detecting a negative servo sync mark from said input signal; and a circuit responsive to said positive servo sync mark and said negative servo sync mark to generate a signal to indicate if said servo sync mark has been reversed and to generate a signal to indicate said pin layer reversal.

2. A circuit to detect pin layer reversal, as in claim 1, wherein said circuit responsive to said positive and negative servo sync mark includes an exclusive OR circuit.

3. A circuit to detect pin layer reversal, as in claim 1, wherein said circuit responsive to said positive and negative servo sync mark includes an AND circuit.

* * * * *